Oct. 3, 1944.  P. M. CHRISTENSEN  2,359,621
HINGE CONSTRUCTION FOR BOXES
Filed July 22, 1942
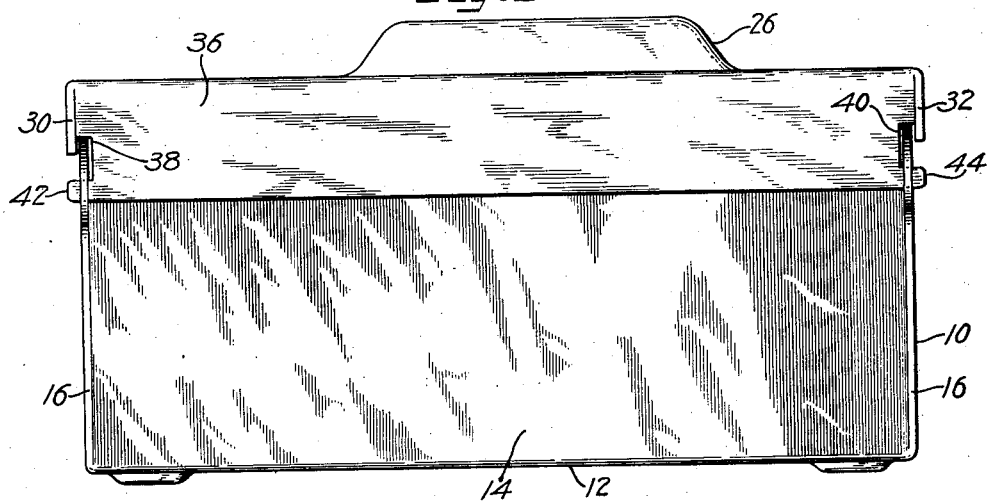
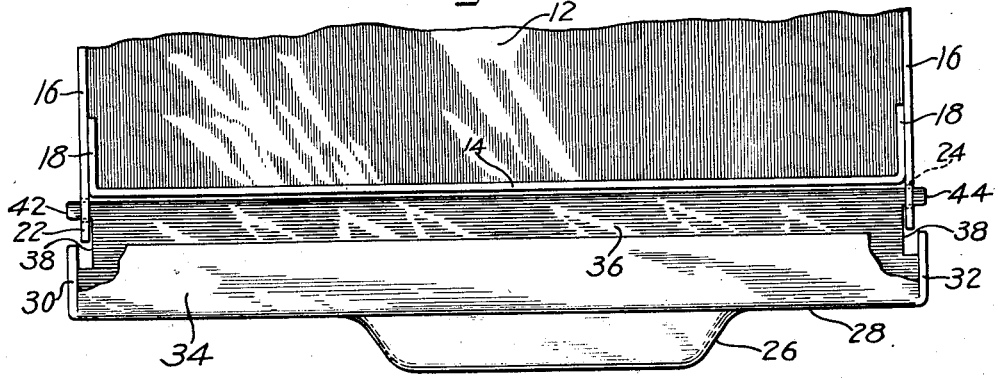
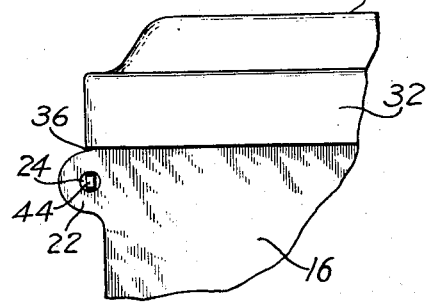
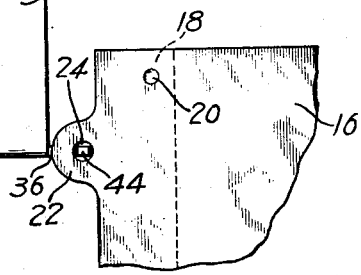
Inventor
Paul M. Christensen
By S. Jay Teller
Attorney Patented Oct. 3, 1944

2,359,621

UNITED STATES PATENT OFFICE 2,359,621

HINGE CONSTRUCTION FOR BOXES

Paul M. Christensen, Newington, Conn., assignor, by mesne assignments, to Federal Electric Products Company, Inc., Newark, N. J., a corporation of New Jersey Application July 22, 1942, Serial No. 451,929

2 Claims. (Cl. 220—31)

This invention relates to a hinge construction for pivotally joining a box and cover and is more particularly for use with a box and cover formed of sheet metal. The box may be used for various purposes. One use for which it is particularly well adapted is to house electrical apparatus such as switches, fuse blocks, circuit breakers and other similar articles, although its use is not to be restricted to housing electrical apparatus.

It is an object of the invention to provide a hinge construction for pivotally joining the cover to a box of the type described, the hinge construction being very simple and formed from various portions of the box and cover whereby no separate or additional hinge element is required to be secured to the box and cover to pivotally join same and no deformation of said portions of the box and cover is required to form the hinge.

It is a further object of the invention to construct the cover and box from sheet metal in such a manner that, when the blanks from which the cover and box are formed are bent into final shape, the cover and hinge will coincidentally be pivotally joined and the elements of the hinge construction united as a result of the bending and shaping operations for the cover and box.

Details of the construction and other objects of the invention are set forth in the following specification and illustrated on the accompanying drawing.

The accompanying drawing shows the embodiment of the invention which is deemed most preferable, but it will be understood that the drawing is intended for illustrative purposes only and is not to be construed as defining or limiting the scope of the invention, the claims forming a part of this specification being relied upon for that purpose.

In the drawing,

Fig. 1 is a vertical elevation of one side of the assembled box and cover showing the hinge construction.

Fig. 2 is a fragmentary plan view of a portion of the box with the cover moved to open position at a right angle to the open face of the box to illustrate details of the hinge construction.

Fig. 3 is a fragmentary side elevation showing one corner of one end of the box on which one hinge element is located.

Fig. 4 is a fragmentary view similar to Fig. 3 but showing the cover in open position corresponding to the position of the cover in Fig. 2.

The preferred embodiment of the present invention comprises an open faced box and a cover pivotally joined thereto, the box and cover being preferably formed of sheet metal although it is to be understood that the principles of the invention may be embodied in boxes constructed of other suitable material which is sufficiently rigid to properly maintain the shape of the box, cover, and hinge construction. The cover of the box is preferably provided with side flanges which are adapted to telescope with the exterior of the sides of the box when the cover is in closed position on the box. A simplified hinge construction is provided comprising substantially parallel apertured ears respectively projecting from one edge of opposite sides or ends of the box adjacent the open face thereof. One side flange of the cover is preferably made wider than the other side flanges and the opposite ends of said wider flange are respectively provided with inward extending notches adjacent the free edge of said flange to produce a pair of oppositely and outward directed pintles adapted to be disposed in the apertures in said ears on the sides of the box. In the most simplified and preferred construction, the ears lie in the same plane as the sides of the box with which they are integral and the pintles on the wider side flange of the cover lie in the same plane as said side flange.

The preferred manner of forming the box and cover is to stamp out the sheet metal blanks from which they are to be formed and subsequently bend the side flanges of the cover into final position. The box is first partially formed into final shape by bending the sides which are not provided with ears into proper shape at substantially right angles to the bottom or back of the box and one of the sides having an ear thereon is then bent into final shape and secured by spot welding or other suitable means to angular flanges which are conventionally formed on various sides of the box for securing the same in final position.

One pintle of the cover is then passed through the apertured ear of the side of the box which has been secured in final position and the fourth side of the box is then bent into final position and, in so doing, the other pintle of the cover is passed through the aperture of the ear of said fourth side of the box. Following this, said last side is secured by spot welding or other suitable means, thus resulting in a finally formed box and cover with the hinge construction being formed and assembled coincident with the formation of the box and cover.

Referring to the drawing, a box 10 is shown having a conventional back or bottom 12, a pair of opposite sides 14 integral therewith, one of which is not shown, and a second pair of opposed sides or ends 16 which are also integral with the bottom 12, all of said parts being preferably formed of sheet metal. The sides 14 are provided with inward directed angular flanges 18 to which the adjacent portions of the sides 16 are secured, when the sides are bent into final shape, by any suitable means such as a spot weld 20 shown in Fig. 4. The opposed sides 16 are each provided with an ear 22 which is preferably integral therewith and extends outward beyond one edge of said side of the box, the ear preferably being formed on said side in the same stamping operation by which the blank for the box is formed. Each of the ears is provided with a circular aperture 24 and is preferably positioned with the innermost portion of the wall of the aperture substantially on the line of the edge of the side to which the ear is secured.

The cover 26 comprises a front portion 28 having opposed pairs of substantially parallel side flanges 30, 32, 34 and 36, all of which are disposed substantially at right angles to the front 28 and are adapted to telescope over the sides of the box when the cover is closed. The cover is preferably formed of sufficiently rigid sheet metal that when the side flanges are bent into final shape, they will maintain their finished shape and position without securing the abutting ends of the flanges together.

It will be noted that the side flange 36 is preferably wider than the flanges 30, 32 and 34 and notches 38 and 40 extend inward from the opposite ends of the flange 36, said notches being disposed adjacent the free edge of the flange in order to define or form oppositely directed and outward extending pintles 42 and 44 respectively formed on opposite ends of the flange 36.

The pintles 42 and 44 are respectively adapted to be disposed in the apertures 24 of the ears 22 in order to pivotally join the box and the cover. In the preferred construction, the pintles 42 and 44 lie in the same plane as the flange 36 and the outer ends of the pintles preferably do not extend beyond the perimeter of the cover, as shown in Figs. 1 and 2. While the ends of the pintles extend slightly beyond the ends of the main portion of the flange 36, it might be said that the ends of said pintles are substantially flush with the ends of the main portion of the flange 36. By thus arranging the ends of the pintles, no objectionable projections are formed on the finished box and cover.

In constructing the box and cover, the cover is formed by bending the side flanges 30 through 36 into proper shape, thus simultaneously disposing the pintles 42 and 44 in final and operative position on the cover. The box is formed by first bending the opposite sides 14 into proper shape and then bending one of the sides or ends 16 into proper position at a right angle to the bottom 12 and said side is secured to the flanges 18 of the sides 14 by suitable means such as spot welds as shown at 20. One of the pintles is then passed through the aperture 24 in the ear on said side 16 and the cover is then properly aligned with respect to the box whereby, when the second side 16 is bent into final shape with respect to the bottom 12, the other pintle of the cover will pass through the aperture of the ear of the second side 16, following which said second side is secured to the flanges 18 of sides 14 similarly as the first side 16.

Inasmuch as the apertured ears 22 respectively lie in the same planes as the sides 16 with which they are integral, the bending of the sides 16 into final shape will also dispose the ears in final position and, by manipulating the cover in the manner described in the foregoing paragraph, it will be seen that the final step of assembling the sides of the box will coincidentally assemble the hinge arrangement or construction for pivotally joining the cover and box.

Inasmuch as the apertured ears and pintles respectively lie in the same planes as the parts of the cover and box to which they are secured, maximum strength is present in said ears and pintles whereby the resulting hinge construction for the box and cover is inherently strong. In addition to producing an inherently strong hinge construction, it will be seen that said construction is also very simple and, particularly in view of the manner of assembling the hinge coincidentally with the formation of the box, the manufacturing cost of the hinge construction is materially reduced due to the elimination of a number of assembly steps which are normally required when the attachment of one or more separate hinges is required.

While the foregoing description and the illustration in the drawing shows the ears secured to the box and the pintles secured to the cover, it is to be understood that the combination is not to be restricted to this specific embodiment since the ears may be formed on the cover and the pintles formed on the box within the purview of the present invention. This and other changes may also be made in the construction of the invention without departing from the spirit thereof and thus the preferred embodiment is to be considered as illustrative rather than restrictive.

What I claim is:

1. A hinge construction for pivotally joining an open ended rectangular box member and cover member having sides adapted to telescope with the open sides of said open end of the box member when the cover is in closed position on the box, said hinge construction comprising in combination, a pair of substantially parallel apertured ears respectively projecting from one edge of opposite sides of said box and spaced inward from the open end of said box and adjacent said telescoping portions of said cover and box, and a pair of oppositely directed pintles respectively projecting from opposite ends of one side of said cover and each defined by a notch extending inward from each of said opposite ends of said one side and between said pintle and telescoping portion of said cover, said pintles being respectively disposed in the apertures of said ears.

2. A hinge construction for pivotally joining an open ended rectangular box member and cover member having sides adapted to telescope with the open sides of said open end of the box member when the cover is in closed position on the box, said hinge construction comprising in combination, a pair of substantially parallel apertured ears respectively projecting from one edge of opposite sides of said box and spaced inward from the open end of said box and adjacent said telescoping portions of said cover and box, and a pair of oppositely directed pintles respectively projecting from opposite ends of one side of said cover and each defined by a notch extending inward from each of said opposite ends of said one side and between said pintle and telescoping portion of said cover, said outer ends of said pintles being substantially flush with the perimeter of said cover and said pintles also being respectively disposed in the apertures of said ears.

PAUL M. CHRISTENSEN.